United States Patent [19]

Vogel

[11] Patent Number: 4,681,719
[45] Date of Patent: Jul. 21, 1987

[54] PRODUCTION OF COMPRESSION MOLDINGS FROM FINELY DIVIDED THERMOPLASTIC POLYMERS

[75] Inventor: Hans-Henning Vogel, Frankenthal, Fed. Rep. of Germany

[73] Assignee: BASF Aktiengesellschaft, Ludwigshafen, Fed. Rep. of Germany

[21] Appl. No.: 742,909

[22] Filed: Jun. 10, 1985

[30] Foreign Application Priority Data

Jun. 14, 1984 [DE] Fed. Rep. of Germany ....... 3421978

[51] Int. Cl.$^4$ .............................................. B29C 11/12
[52] U.S. Cl. ..................... 264/122; 264/118; 264/130; 264/131; 264/140; 264/300; 264/320
[58] Field of Search ............. 264/300, 320, 211, 122, 264/109, 118, 131, 140, 130, 125–127

[56] References Cited

U.S. PATENT DOCUMENTS

| | | | |
|---|---|---|---|
| 2,849,415 | 8/1958 | Stott | 264/122 |
| 2,855,377 | 10/1958 | Stott | 264/122 |
| 3,012,900 | 12/1961 | Kleinmann et al. | 264/122 |
| 3,400,087 | 9/1968 | Robb et al. | 264/131 |
| 3,413,394 | 11/1968 | Jordan | 264/126 |
| 3,585,094 | 6/1971 | Ruggles | 264/300 |
| 3,600,309 | 8/1971 | Loser et al. | 264/236 |
| 3,663,666 | 5/1972 | Vincent | 264/122 |
| 4,183,887 | 1/1980 | Karg | 264/131 |
| 4,187,360 | 2/1980 | Peters | 264/236 |
| 4,302,413 | 11/1981 | Howe et al. | 264/126 |

FOREIGN PATENT DOCUMENTS

| | | | |
|---|---|---|---|
| 57-73024 | 5/1982 | Japan | 264/300 |
| 2052357A | 1/1981 | United Kingdom | 264/126 |

*Primary Examiner*—Jeffery Thurlow
*Attorney, Agent, or Firm*—John H. Shurtleff

[57] ABSTRACT

Compression moldings are produced from finely divided thermoplastic polymers by a method in which the polymer particles are mixed with an effective amount of amorphous silica before being subjected to compression molding.

Compression moldings of this type are used for the preparation of finishes, paints and lubricating oils, depending on the type of the polymers.

2 Claims, No Drawings

PRODUCTION OF COMPRESSION MOLDINGS FROM FINELY DIVIDED THERMOPLASTIC POLYMERS

The present invention relates to a process for the production of compression moldings from finely divided thermoplastic polymers.

It is well known that thermoplastic polymers are frequently obtained industrially in the form of small particles having a low bulk density, for example when solution polymers are precipitated from their solutions and the precipitated particles are then dried.

Since the polymers are always processed further, for example by melting them for shaping purposes or redissolving them for their intended use or for further reactions, small particles are advantageous. On the other hand, the particles frequently have a very low bulk density, particularly when they are crumbly or flaky, and transport and storage therefore entail high costs. In these cases, it is altogether more economical to compress the particles to solid blocks and to transport and store them in this form. Although the blocks then have to be comminuted again before use, this disadvantage is scarcely significant since blocks obtained by compressing finely divided particles are substantially easier to comminute than are blocks cast from polymer melts.

Frequently, however, compression of the particles does not give the desired stable blocks but only blocks which disintegrate into larger or smaller pieces even under low mechanical load, this being the case even when high molding pressure is used.

It is an object of the present invention to overcome this disadvantage.

We have found that this object is achieved by a process for the production of compression moldings from finely divided thermoplastic polymers, wherein the polymer particles are mixed with an effective amount of amorphous silica before being subjected to compression molding.

The fact that stable compression moldings are obtained in this manner is very remarkable since it is known that amorphous silica is recommended and used as an antitack agent for polymer particles which still possess a certain tack and which are to be kept free-flowing. However, the action of amorphous silica as an antitack agent generally begins only at a concentration of 0.4% by weight of $SiO_2$, the action as a pressing assistant frequently decreasing substantially again.

In contrast, the amounts in which the amorphous silica is effective in the novel process as a pressing assistant are as a rule from 0.01 to 0.3% by weight, based on the amount of the polymer.

The amorphous silica used according to the invention may be obtained from various sources. Examples of suitable substances are natural silicas (siliceous earths), kieselguhr and silica gels of different types, which are obtainable commercially as, inter alia, fillers, drying agents, absorbents and antitack agents in various grades. Particularly suitable are synthetic amorphous silicas as obtained, for example, by flame hydrolysis of silicon halides (pyrogenic silica) or by precipitation of alkali metal silicates with acids by a wet method.

Natural amorphous silicas are also suitable. They can contain accompanying substances, such as alkali metal and alkaline earth metal silicates, since these do not present problems for the present intended use. On the basis of observations to date, special properties, such as specific surface area or particular purity, are not important here; nor is the particle size, since all amorphous $SiO_2$ grades are sufficiently finely divided or disintegrate into sufficiently fine particles during mixing processes.

If the end products which are to be produced from the polymers are not required to exhibit high transparency, as in the case of, for example, clear finishes, the small amounts of $SiO_2$ are not troublesome, especially since the polymers are in any case generally mixed with fillers or pigments.

The chemical nature of the polymers has no detectable effect on the success of the novel process, although a certain plasticity appears to be a precondition for this. The process can therefore be applied in principle to thermoplastic polymers, i.e. to homopolymers and copolymers of olefins, of butadiene, of isoprene, of styrene, of vinyl esters and of esters, amides and nitriles of acrylic acid and of methacrylic acid.

The process is of course particularly important in the case of solution polymerization since in this case the pure polymers are, as a rule, precipitated with another solvent, with thorough stirring, in the form of small particles, which are subsequently dried.

Such polymers are, for example, unhydrogenated or hydrogenated copolymers of butadiene and/or isoprene and/or isobutene on the one hand and styrene on the other hand, these polymers being used for improving the viscosity properties of lubricating greases and lubricating oils of all types, in particular multigrade oils for internal combustion engines. The small amounts of amorphous $SiO_2$ have no effect on the quality of the lubricating oils because the pressing assistant is a very finely divided and soft material which cannot cause any mechanical abrasion at the engine and gear components lubricated.

Another field of use for the novel process is the production of blocks from particles of thermoplastic polymers which serve as a base for finishes and paints.

Mixing of the polymer particles with the amorphous $Si_2$ does not present any problems and can be carried out by the conventional methods. Polymer particles are obtained which are covered with a thin powder layer of the assistant.

The subsequent molding to give the solid compression moldings (generally blocks) can likewise be carried out readily, so that no further information is required in this case too. It should merely be pointed out that the molding pressure required, at the same compression temperature, for compression molding of the particles pretreated according to the invention is substantially lower than the pressure which would be required to achieve the same result in the case of material which has not been pretreated.

EXAMPLE

A hydrogenated random copolymer which consisted of 53% by weight of styrene and 47% by weight of butadiene and had a mean molecular weight of 110,000, as used as a viscosity index improver for lubricating oils, which was prepared by solution polymerization and subsequent hydrogenation in cyclohexane and whose melt was extruded after distillative removal of the cyclohexane and comminuted to particles of 1–2 mm diameter, was compressed with amorphous $SiO_2$ (® Aerosil 200 from Degussa) in an experimental press at room temperature and at about 40° C. under various conditions to give disk-shaped compression moldings (12 cm diameter, 2 cm thickness), the compression time being 5 minutes in each case. Details of these experiments and of corresponding comparative experiments without the SiO$_2$, and the results of these, are shown in the Table below, from which it can be seen that the effective amount of the amorphous SiO$_2$ in this case was about 0.05% by weight, based on the amount of the polymer, depending on the molding pressure.

TABLE

Compression molding of the polymer particles according to the example

| Experiment No. | SiO$_2$ [% by weight] | Molding pressure [bar] | Temperature [°C.] | Result |
| --- | --- | --- | --- | --- |
| *for comparison* | | | | |
| 1a | — | 20 | 25 | no molding obtained, material remains substantially crumbly |
| b | — | 50 | " | moldings cake slightly and disintegrate readily |
| c | — | 100 | " | moldings can be crumbled by hand and have no flexural strength |
| d | — | 200 | " | moldings can be crumbled by hand and have no flexural strength |
| *according to the invention* | | | | |
| 2a | 0.05 | 50 | 25 | moldings cake and are difficult to crumble by hand |
| b | " | 100 | " | moldings are stable but have no flexural strength |
| c | " | 200 | " | moldings are stable and virtually all of them have flexural strength |
| d | " | 50 | 40 | substantially fused moldings all of which possess flexural strength |

We claim:

1. A process for the production of a stable compression molded block of finely divided particles of a thermoplastic polymer, which process comprises:

mixing the polymer particles with from 0.01 to 0.3% by weight, based on the amount of the polymer, of amorphous silica; and then subjecting the resulting mixture to compression molding at a temperature and pressure sufficient to form a stable comminutable block of polymer particles but insufficient to produce a polymer melt.

2. A process as claimed in claim 1, which is applied to a polymer which consists essentially of a hydrogenated thermoplastic copolymer of styrene and at least one other monomer selected from the group consisting of butadiene and isoprene.

* * * * *